United States Patent [19]

Gras et al.

[11] Patent Number: 5,153,296
[45] Date of Patent: Oct. 6, 1992

[54] EPOXIDE RESIN MIXTURES WHICH HARDEN AT ROOM TEMPERATURE

[75] Inventors: Rainer Gras, Bochum; Elmar Wolf, Recklinghausen, both of Fed. Rep. of Germany

[73] Assignee: Huels Aktiengesellschaft, Marl, Fed. Rep. of Germany

[21] Appl. No.: 727,604

[22] Filed: Jul. 9, 1991

[30] Foreign Application Priority Data

Jun. 9, 1990 [DE] Fed. Rep. of Germany ....... 4028287

[51] Int. Cl.$^5$ ............................................. C08G 18/30
[52] U.S. Cl. ..................................... 528/60; 528/107; 528/121; 528/124; 524/102
[58] Field of Search ................ 528/60, 107, 121, 124, 528/102

[56] References Cited

U.S. PATENT DOCUMENTS 3,950,451 4/1976 Suzuki et al. ...................... 528/107
4,191,683 3/1980 Brunnetti et al. ................... 524/102

*Primary Examiner*—Maurice J. Welsh
*Assistant Examiner*—D. V. C. Truonka
*Attorney, Agent, or Firm*—Oblon, Spivak, McClelland, Maier & Neustadt

[57] ABSTRACT

The invention relates to epoxide resin mixtures hardenable at room temperature, comprised of:

(A) Polyepoxides with more than one epoxide group per molecular;
(B) Aliphatic or cycloaliphatic polyamines with more than two active hydrogen atoms bound to the nitrogen of the amino groups;
(C) A reaction product having mean m.w. 500–8,000 of:
  (c1) a polyalkylene ether polyol prepared from alkylene oxides and one member selected from the group consisting of di-functional alcohols, polyfunctional alcohols, or mixtures thereof, and
  (c2) an aliphatic or cycloaliphatic diisocyanate, wherein the NCO : OH ratio is 2:1, and wherein said reaction product is blocked with a certain sterically hindered piperidine derivative; and optionally
(D) Customary fillers, pigments, reaction accelerators, and viscosity regulators.

11 Claims, No Drawings

EPOXIDE RESIN MIXTURES WHICH HARDEN AT ROOM TEMPERATURE

BACKGROUND OF THE INVENTION

1. Field of the Invention

The invention relates to epoxide resin mixtures which harden at room temperature and are comprised of epoxide resins (EP resins) based on bisphenol A, aliphatic or cycloaliphatic polyamines with more than 2 H atoms in the molecule, and polyether polyol/diisocyanate prepolymers wherein the free NCO groups are blocked with selected piperidine derivatives.

2. Discussion of the Background

EP resins hardened with polyamines are distinguished in practice by a number of desirable properties, e.g., good adhesion to all possible substrates, good solvent resistance, and high resistance to the action of chemicals. Due to the high crosslinking density of the amine-hardened EP resins, particularly such resins based on bisphenol A, these resins are brittle, with glass transition temperatures above 20° C., and therefore means must be taken to make them flexible, particularly in the case of applications for which impact strength, shock resistance, and high flexibility are required.

The compounds most often used to plasticize cold-hardened amine/EP resin compounds are the aromatic carbamic acid aryl esters described in Ger. OS 21 52 606. These esters are bound into the polymer network upon hardening of the EP resins and polyamines, such binding occurring due to the reaction of the amino groups with the carbamic acid ester groups whereby alkylphenol is liberated.

A crucial drawback of amine-hardened EP resins plasticized with carbamic acid esters is the fact that they harden only slowly at room temperature (RT), because the amino groups react substantially slower at RT with the carbamic acid ester groups than with the EP groups. Despite the good mechanical properties of plasticized epoxy resins, no one has yet developed a plasticized amine-hardened EP resin which rapidly hardens at room temperature.

SUMMARY OF THE INVENTION

Accordingly, one object of the present invention is to overcome this drawback, and provide EP resin mixtures hardenable at RT which harden rapidly to form coatings, adhesives, sealants, and molded pieces. These EP resin mixtures are resistant to chemicals, have good adhesion, and have high impact strength and shock resistance.

Another object of the present invention is to provide a plasticizer for amine hardened EP resins.

Another object of the present invention is to provide a plasticizing hardener for amine-hardened EP resins.

This problem is solved by the use of polyisocyanates in amine-hardened EP resins, wherein the polyisocyanates are partially blocked with selected piperidine derivatives.

One object of the present invention is provided by an EP resin mixtures hardenable at RT, comprising:

(A) PolyEPs with more than one EP group per molecule;

(B) Aliphatic or cycloaliphatic polyamines with more than two active hydrogen atoms bound to the nitrogen of the amino groups;

(C) A reaction product having a mean m.w. 500–8,000, of:
  (c1) a polyalkylene ether polyol prepared from alkylene oxides and one member selected from the group consisting of di-functional alcohols, polyfunctional alcohols and amines or mixtures thereof, and
  (c2) a aliphatic or cycloaliphatic diisocyanate,
  wherein the of NCO:OH ratio is 2:1,
and wherein said reaction product is blocked with a piperidine derivative having one of the following formulas:

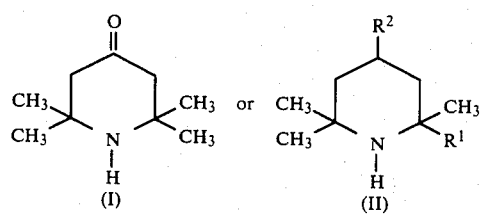

where $R^1 = H, CH_3$

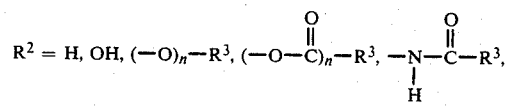

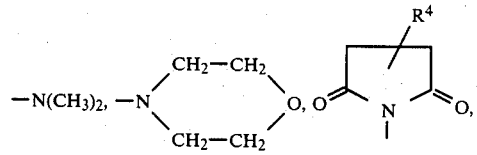

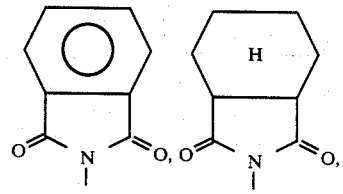

wherein n=1,2;

$R^3$ represents a $C_{1-18}$ alkyl group, when n=1, or a $C_{2-18}$ alkylene group, when n=2; and $R^4$ represents H, or a $C_{1-20}$ alkyl group; and, optionally, (D) Customary fillers, pigments, reaction accelerators, and viscosity regulators.

Another object of the present invention is provided for by an epoxide resin plasticizer comprising:

A reaction product having a mean m.w. 500–8,000, of:
  i) a polyalkylene ether polyol prepared from alkylene oxides and one member selected from the group consisting of di-functional alcohols, polyfunctional alcohols and amines or mixtures thereof, and
  ii) a aliphatic or cycloaliphatic diisocyanate,
  wherein the of NCO:OH ratio is 2:1,
and wherein said reaction product is blocked with a piperidine derivative having one of the following formulas:

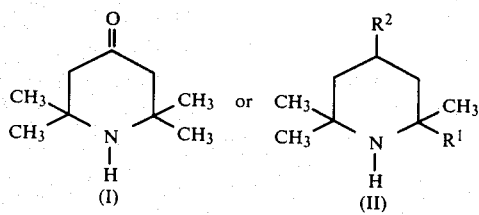

where $R^1 = H, CH_3$

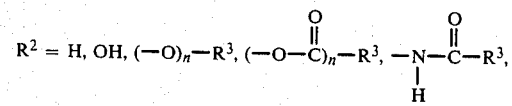

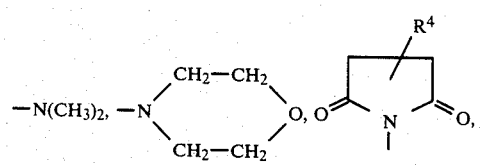

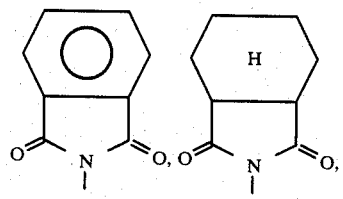

wherein n=1,2;

$R^3$ represents a $C_{1-18}$ alkyl group, when n=1, or a $C_{2-18}$ alkylene group, when n=2; and $R^4$ represents H, or a $C_{1-20}$ alkyl group.

Another object of the present invention is provided for by a plasticizing hardener for amine-hardened EP resins comprising:

(A) A reaction product having a mean m.w. 500–8,000, of:

i) a polyalkylene ether polyol prepared from alkylene oxides and one member selected from the group consisting of di-functional alcohols, polyfunctional alcohols and amines or mixtures thereof, and ii) a aliphatic or cycloaliphatic diisocyanate, wherein the of NCO:OH ratio is 2:1, and wherein said reaction product is blocked with a piperidine derivative having one of the following formulas:

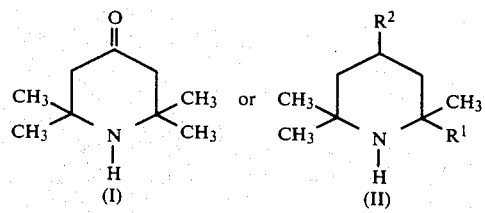

where $R^1 = H, CH_3$

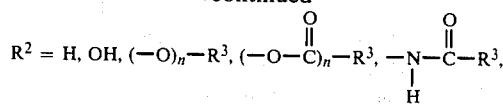

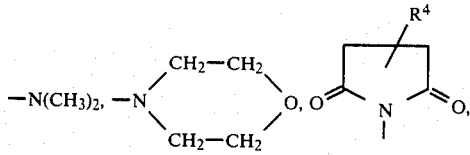

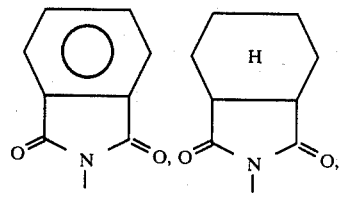

wherein n=1,2;

$R^3$ represents a $C_{1-18}$ alkyl group, when n=1, or a $C_{2-18}$ alkylene group, when n=2; and $R^4$ represents H, or a $C_{1-20}$ alkyl group; and, (B) aliphatic or cycloaliphatic polyamines with more than two active hydrogen atoms bound to the nitrogen of the amino groups.

DETAILED DESCRIPTION OF THE PREFERRED EMBODIMENTS

The plasticizers (C) to be used are reaction products of linear or branched polyalkylene ether polyols and aliphatic or cycloaliphatic diisocyanates, wherein 2 NCO equivalents of the diisocyanate are brought to react per OH equivalent of the polyether polyol, and the free NCO groups are blocked with piperidine derivatives of formulas (I) and (II).

Candidates for use as linear or branched polyol components include polyalkylene polyether polyols with mean molecular weights of 200–7,000, which components are obtained by copolymerization, block copolymerization, or anionic polymerization, of alkylene oxides (such as, in particular, ethylene oxide or propylene oxide) with i) di- or polyhydric alcohols (such as ethylene glycol, 1,3-propanediol, butanediol, or 1,1,1-tri-hydroxymethylpropane), or ii) amines (such as ethylenediamine or 1,6-hexanediamine), as starter components, or by cationic polymerization and copolymerization of cyclic ethers (such as tetrahydrofuran, ethylene oxide, and propylene oxide), using acid catalysts.

The above-mentioned polyol compounds are reacted in a known manner with aliphatic or cycloaliphatic diisocyanates where the NCO : OH ratio is 2:1, to form the corresponding prepolymers with NCO groups in end positions.

Suitable aliphatic or cycloaliphatic polyisocyanates which might be mentioned include, e.g., 1,6-hexanediisocyanate, isophoronediisocyanate (IPDI), 2,4,4- and/or 2,2,4-trimethyl-1,6-hexanediisocyanate (TMDI), methylenebis(4-cyclohexylisocyate), tetramethyl-m-xylylenediisocyanate, 1,4-bis(isocyanatomethyl)cyclohexane, and 2-methyl-1,5-pentanediisocyanate.

The NCO groups in the end positions of the di- or polyfunctional prepolymers are then reacted with piperidine derivatives (I) or (II) at 50°–100° C. wherein 1 mol of piperidine compound is brought to reaction per 1 equivalent of NCO.

Preferred piperidine derivatives employed according to the invention are 2,2,6,6-tetramethyl-4-dimethylaminopiperidine and 2,2,6,6-tetramethyl-4-oxopiperidine (TAA).

The prepolymers containing the NCO groups may be prepared and blocked in the mass or in solvents which are inert to NCO groups.

The polyepoxides employed according to the invention are substances with more than one epoxide group. Particularly preferred are glycidyl polyethers of diphenylolpropane with an epoxy value of between 0.02 and 0.6. If necessary or desirable, one may add reactive thinners, e.g., glycidyl ethers, to the polyEPs, to reduce the viscosity.

According to the invention, polyamines are employed along with the polyEPs. Examples of usable polyamines are ethylenediamine, diethylenetriamine, triethylenetetramine, 2,2,4- and/or 2,4,4-trimethyl-1,6-hexanediamine (TMD), 1,4-diaminocyclohexane, isophoronediamine (IPD), and 3,3'-dimethyl-4,4'-diaminodicyclohexylmethane (Laromin®C260).

The inventive mixtures contain compounds (C) in the amount of between 10 and 80%.

The polyEP is generally reacted with the polyamine in an equivalent ratio of 1:1. However, because the plasticizer (C) also reacts with the amine, the polyamine must be added in amounts such that
i) stoichiometric hardening of the EP groups can occur, and
ii) the blocked NCO groups of the plasticizer can react to form urea groups.

The plasticizer can be mixed in with the polyamine and/or with the PolyEP. To accelerate the hardening, catalysts may be employed (e.g., tertiary amines, or reaction products of phenols with and substituted phenols formaldehyde and ammonia (DMP®30)), wherein the amount of catalyst added may be up to 5%.

The inventive mixtures are suited for paint-type coatings, and for casting resins, for applications where high elasticity is important.

The inventive mixtures are also suited for preparing 2-component EP adhesives for structural adhesive applications. When adhesively joining metals, for example, one proceeds by mixing the individual components (blocked NCO prepolymer, diamine, and EP resin) at RT and applying the mixture to the metals which are to be joined. The bonded metals must be fixed until the bonding is completed. It is unnecessary to first add the blocked NCO prepolymer portion-wise to the diamine-/EP mixture when producing the bonded joints, but it is advantageous to add the blocked NCO prepolymer to the diamine to form one of the components of the inventive 2-component EP adhesive for bonding metals. The metals bonded with the inventive adhesive reaction mixture at RT are distinguished by high tensile-shear strength which remains high even at 80° C.

Other features of the present invention will become apparent in the course of the following descriptions of exemplary embodiments which are given for illustration of the invention and are not intended to be limiting thereof.

A. General manufacturing method for the inventive compounds

The blocked NCO prepolymers are prepared in two steps. In the first step, the NCO prepolymers are produced by reaction of the polyol with the diisocyanate, with an NCO:OH ratio of 2:1, wherein the components are heated together at 80° C. until the NCO content reaches the intended value. Thereafter, in the second step, the piperidine derivative blocking agent is added (at 80° C.). After the addition of the blocking agent has been concluded, the reaction mixture is heated further at 80° C. until the NCO content is <0.3%.

B. Manufacture of flexible EP coatings which harden at room temperature

I. Manufacture of the plasticizers

EXAMPLE 1

2,000 parts by weight (pbw) of a (linear) polyoxypropylene glycol with an OH number of 56 mg KOH/g was heated at 80° C. with 444 pbw of isophoronediisocyanate (IPDI) until the NCO content of the reaction mixture was about 3.4%. Then 282 pbw of 2,2,4,6-tetramethylpiperidine was added portion-wise to the reaction mixture under intensive stirring, and the mixture was heated further at 80° C. until the NCO content of the mixture fell to about 0.3%. The viscosity of the reaction product was 54,000 mPa.s at 25° C.

Example 2

3,000 pbw of a (branched) polyoxypropylene glycol with an OH number of 56 mg KOH/g was reacted with 666 pbw of IPDI in a manner analogous to Example 1. As in Example 1, the second step comprised reaction with 2,2,4,6-tetramethylpiperidine, but the amount of piperidine derivative was 423 pbw. The viscosity of the reaction product was 35,000 mPa s at 25° C.

Example 3

2,000 pbw of a linear polyoxypropylene glycol with an OH number of 56 mg KOH/g was heated at 80° C. with 444 pbw of IPDI until the NCO content of the reaction mixture was about 3.4%. Then 310 pbw of 2,2,6,6-tetramethyl-4-oxopiperidine (TAA) was added portion-wise under intensive stirring, and the mixture was heated for about an additional 4 hr at 80° C. The viscosity of the reaction product was 8,100 mPa.s at 25° C., and the NCO content of the product was <0.3%.

Example 4

1020 pbw of a branched polyoxypropylene glycol with an OH number of 27.5 mg KOH/g was heated at 80° C. with 111 pbw of IPDI until the NCO content had fallen to 1.7%. Then 77.5 pbw of TAA was added portion-wise under intensive stirring, and the mixture was heated for about an additional 5 hr at 80° C. The viscosity of the reaction product was 12,600 mPa.s at 25° C., and the NCO content of the product was <0.3%.

II. Plasticization of epoxide resins

1. Resin systems

COMPARISON EXAMPLE p-Nonylphenol instead of 2,2,4,6-tetramethylpiperidine was used to block the NCO prepolymer (having 3.4% NCO) from Example (B.I.1). 28.9 pbw of this NCO prepolymer blocked with nonylphenol was mixed with 14.4 pbw of isophoronediamine (IPD) and 56.6 pbw of an EP based on bisphenol A with an EP equivalent weight of 190, and 2 pbw p-toluenesulfonic acid methyl ester. After a ripening time of about 10 min, the mixture was applied to metal plates, and some of the applications were hardened for 7 days at RT and others for 30 min at 120° C.

| | Hardening Conditions | |
|---|---|---|
| | 7 Days, Room Temperature | 30 min., 120° C. |
| Outward Appearance of the film | milky, cloudy, non-tacky, and brittle | clear, strongly adhesive and flexible |

Thus, the comparison EP resin does not yield an acceptable film when hardened at room temperature.

EXAMPLE 1 (according to the invention)

28.9 pbw of the inventive compound (B.I.1) was mixed intensively with 14.4 pbw of IPD, 56.6 pbw of the bisphenol A based EP resin described in the Comparison Example, and 2 pbw of p-toluenesulfonic acid methyl ester. After a ripening time of about 10 min, the mixture was applied to metal plates, and some of the applications were hardened for 7 days at RT and others for 30 min at 120° C. In contrast to the films obtained in the Comparison Example, both of these films were clear, non-tacky and flexible.

| | Hardening Conditions | |
|---|---|---|
| | 7 Days, Room Temperature | 30 min., 120° C. |
| Outward Appearance of the film | clear, non-tacky, and flexible | clear, non-tacky and flexible |

The resin data for curing for 7 days at room temperature are given in Table 1:

mixture, 60 pbw of an EP resin (based on bisphenol A and epichlorohydrin and having an EP value of 0.53) was added under intensive stirring. Then 2 pbw of 2,4,6-tris(dimethylaminomethyl)phenol (DMP®300) was added. After a ripening time of 15 min, the reaction mixture was cast into plates 4 mm thick and was allowed to harden at 23° C. After 7 days hardening at 23° C., the tensile strength, elongation at failure (DIN 53 455), crack propagation strength (DIN 53 515), and Shore hardness (DIN 53 505) were measured. The measurement data are summarized in Table II.

The hardened compound was clear and transparent, and nontacky.

EXAMPLE 2

60 pbw of the blocked NCO prepolymer from Example (B.I.3), 40 pbw of the EP resin from Example (B.II.2.1), 12.6 pbw of IPD, and 2 pbw of DMP®30 were mixed accordingly to Example (B.II.2.1) and cast into plates 4 mm thick. The plates and were allowed to harden for 7 days, followed by testing as in Example (B.II.2.1). The measurement data are summarized in Table II.

EXAMPLE 3

80 pbw of the blocked NCO prepolymer from Example (B.I.3), 20 pbw of the EP resin from Example (B.II.2.1), 8.4 pbw of IPD, and 2 pbw of DMP®30 were mixed accordingly to Example (B.II.2.1) and cast into plates 4 mm thick. The plates were allowed to harden for 7 days at 23° C., followed by testing as in Example (B.II.2.1). The measurement data are summarized in Table II.

EXAMPLE 4

60 pbw of the blocked NCO prepolymer from Example (B.I.4), 40 pbw of the EP resin from Example (B.II.2.1), 11 pbw of IPD, and 2 pbw of DMP®30 were

TABLE I

| | Weight Percent | | | Resin Properties | | | | | |
|---|---|---|---|---|---|---|---|---|---|
| Ex. No. | Diamine | Plasticizer | Epoxide, based on bisphenol A and having an epoxide equivalent of weight 190 | Layer thickness (μm) | Hardness according to Koenig (seconds) (DIN 53 157), after 1, 3 and 7 days, respectively | | | Grid cutting test (DIN 53 151) | Eirchsen cupping (mm) (DIN 53 156) | Impact reversal (g-m) |
| | | | | | 1 | 3 | 7 | | | |
| 1 | 14.4 IPD | 28.9 I.1 | 56.6 | 65–80 | 71 | 121 | 144 | 0 | 9.0 | >944.6 |
| 2 | 14.8 IPD | 26.3 I.1 | 58.8 | 55–70 | 95 | 146 | 168 | 1 | 0.4 | 460.7 |
| 3 | 27.7 IPD - Blend S | 13.9 I.1 | 58.2 | 60–70 | 66 | 137 | 152 | 1 | 9.8 | 944.6 |
| 4 | 14.6 TMD | 21 I.1 | 64.4 | 40–70 | 20 | 60 | 77 | 0 | >10 | >944.6 |
| 5 | 23.7 V 214 | 17 I.1 | 59.3 | 80–100 | 30 | 135 | 148 | 0 | >10 | >944.6 |
| 6 | 17.9 LAROMIN ® C 260 | 34.2 I.1 | 47.8 | 30–45 | 44 | 132 | 143 | 0 | 9.8 | >944.6 |
| 7 | 14.3 IPD | 28.2 I.2 | 57.5 | 30–45 | 84 | 143 | 160 | 0 | >10 | >944.6 |

IPD - Blend - 50 pbw IPD, 44 pbw benzylalcohol, and 6 pbw salicylic acid.
V214 is an aliphatic diamine and a commercial product of Huels AG.
Laromin ® C260 is 3,3'-dimethyl-4,4'-diaminodicyclohexylmethane.
All the Examples in Table I, with the exception of Example 3 include the use of an additional 2 pbw p-toluenesulfonic acid methylester as a catalyst.

B II.2. Thick-layer-systems

EXAMPLE 1

40 pbw of the blocked NCO prepolymer from Example (B.I.3) was mixed with 15.9 pbw of IPD. To this mixed according to Example (B.II.2.1) and cast into plates 4 mm thick. The plates were allowed to harden for 7 days at 23° C., followed by testing as in Example (B.II.2.1). The measurement data are summarized in Table II.

TABLE II

| Example Number [(from Section B.II.2)] | Tensile strength (N/mm$^2$) (DIN 53 504) | Elongation at failure (%) (DIN 53 504) | Crack propagation strength (N/mm) (DIN 53 515) | Shore D hardness (DIN 53 505) |
|---|---|---|---|---|
| 1 | 35.3 | 17 | Unmeasurable, because the sample | 78 |

TABLE II-continued

| Example Number [(from Section B.II.2)] | Tensile strength (N/mm²) (DIN 53 504) | Elongation at failure (%) (DIN 53 504) | Crack propagation strength (N/mm) (DIN 53 515) | Shore D hardness (DIN 53 505) |
|---|---|---|---|---|
| | | | broke as soon as tension was applied | |
| 2 | 15.4 | 40 | 24 | 57 |
| 3 | 5.3 | 184 | 11.1 | 75 Shore A hardness |
| 4 | 13.5 | 94 | 55.3 | 55 |

C. Adhesive bonding

The liquid EP resin, the blocked NCO prepolymer, and IPD (plus 2% DMP®30) were mixed together intensively. (The order of mixing is arbitrary, but it has proven advantageous to employ the IPD, DMP®30, and blocked NCO prepolymer together as a single component.) After the adhesive was applied to the test plates, the plates were pressed together by screw force until bonding occurred. After hardening for 7 days at RT, the test plates bonded at an overlapped section were tested for tensile-shear strength (N/mm²) (DIN 53 283), at RT and 80° C. The compositions of the 2-component EP adhesives and the tensile-shear strengths of the bonds of the steel plates bonded with said adhesives are given in Table III.

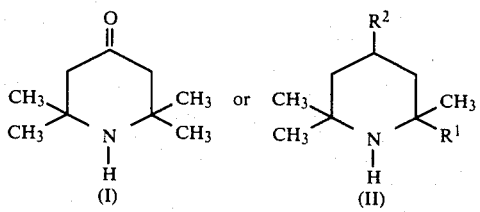

where $R^1 = H, CH_3$

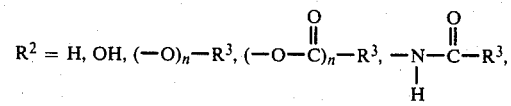

TABLE III

| Example Number [(from Section C)] | Composition of the 2-component epoxy adhesive (parts by weight) (pbw) | | | Tensile-shear strength of the bond between the steel plates (N/mm²) | |
|---|---|---|---|---|---|
| | | | | Room temperature | 80° C. |
| 1 | 30 pbw of the blocked prepolymer according to Example (B.I.3) | 68.2 pbw "Epikote 828" | 17 IPD* | 7 | 8 |
| 2 | 40 pbw of the blocked prepolymer according to Example (B.I.3) | 65.6 pbw "Epikote 828" | 17 IPD* | 18 | 11 |
| 3 | 50 pbw of the blocked prepolymer according to Example (B.I.3) | 63 pbw "Epikote 828" | 17 IPD* | 19 | 10 |

*All these mixtures also contain 2 pbw of DMP ® 30

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An epoxide resin mixtures hardenable at room temperature, comprising:
   (A) Polyepoxides with more than one epoxide group per molecule;
   (B) Aliphatic or cycloaliphatic polyamines with more than two active hydrogen atoms bound to the nitrogen of the amino groups; and
   (C) A reaction product having a mean m.w. 500–8,000, of:
       (c1) a polyalkylene ether polyol prepared from alkylene oxides and one member selected from the group consisting of di-functional alcohols, polyfunctional alcohols, and amines, or mixtures thereof, and
       (c2) an aliphatic or cycloaliphatic diisocyanate, wherewith the NCO : OH ratio is 2:1,
and wherein said reaction product is blocked with a piperidine derivative having one of the following formulas:

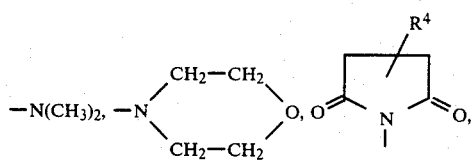

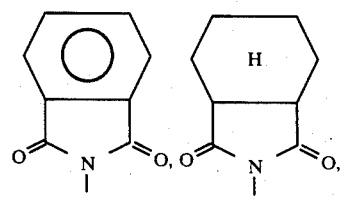

wherein n = 1,2;
R³ represents a $C_{1-18}$ alkyl group, when n = 1, or a $C_{2-18}$ alkylene group, when n = 2; and
R⁴ represents H, or a $C_{1-20}$ alkyl group.

2. The epoxide resin mixture of claim 1, which further comprises a component selected from the group consisting of fillers, pigments, reaction accelerators, and viscosity regulators or a mixture thereof.

3. The epoxide resin mixture of claim 1, wherein said reaction product is present in 10-80%.

4. The epoxide resin mixture of claim 1, wherein the equivalent ratio of polyepoxide to polyamine is 1:1.

5. The epoxide resin mixture of claim 2, wherein the reaction accelerator is present in up to 5%.

6. The epoxide resin mixture of claim 1 wherein the polyepoxide has an epoxy value of 0.02-0.6.

7. The epoxide resin mixture of claim 1, wherein the polyepoxide is a glycidyl polyether of diphenylolpropane.

8. The epoxide resin mixture of claim 1, wherein the aliphatic or cycloaliphatic polyisocyanate is selected from the group consisting of:
1,6-hexanediisocyante, isophoronediisocyanate, 2,4,4-trimethyl-1,6-hexandediisocyanate, methylene bis(4-cyclohexylisocyanate), tetramethyl-m-xylyenediisocyante, 1,4-bis(isocyanatomethyl)cyclohexane and 2-methyl-1,5-pentanediisocyanate or a mixture thereof.

9. The epoxide resin mixture of claim 1, wherein the aliphatic or cycloaliphatic polyamine is selected from the group consisting of ethylenediamine, diethylenetriamine, triethylenetetramine, 2,2,4-trimethyl-1,6-hexanediamine, 2,4,4-trimethyl-1,6-hexanediamine, 1,4-diaminocyclohexane, isophoronediamine, and 3,3'-dimethyl-4,4'-diaminodicyclohexylmethane or a mixture thereof.

10. An epoxide resin plasticizer comprising:
A reaction product having a mean m.w. 500-8,000, of:
i) a polyalkylene ether polyol prepared from alkylene oxides and one member selected from the group consisting of di-functional alcohols, polyfunctional alcohols and amines or mixtures thereof, and
ii) an aliphatic or cycloaliphatic diisocyanate, wherein the of NCO:OH ratio is 2:1,
and wherein said reaction product is blocked with a piperidine derivative having one of the following formulas:

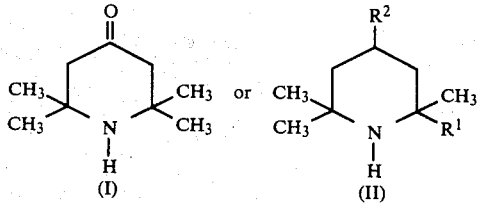

where
$R^1$ = H, CH$_3$

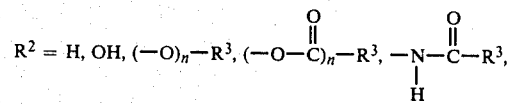

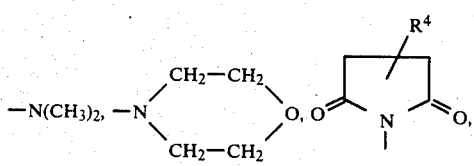

wherein n=1,2;
$R^3$ represents a $C_{1-18}$ alkyl group, when n=1, or a $C_{2-18}$ alkylene group, when n=2; and
$R^4$ represents H, or a $C_{1-20}$ alkyl group.

11. A plasticizing epoxide resin hardener for amine-hardened EP resins comprising:
(A) A reaction product having a mean m.w. 500-8,000, of:
i) a polyalkylene ether polyol prepared from alkylene oxides and one member selected from the group consisting of di-functional alcohols, polyfunctional alcohols and amines or mixtures thereof, and
ii) an aliphatic or cycloaliphatic diisocyanate, wherein the of NCO:OH ratio is 2:1,
and wherein said reaction product is blocked with a piperidine derivative having one of the following formulas:

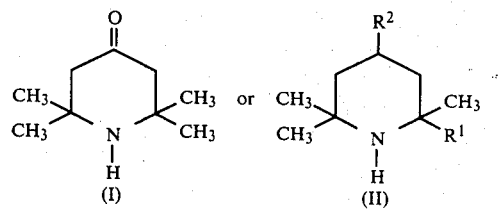

where
$R^1$ = H, CH$_3$

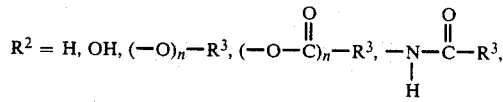

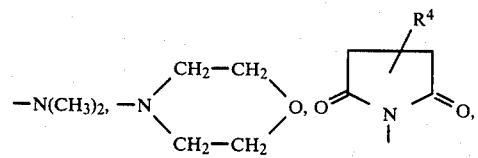

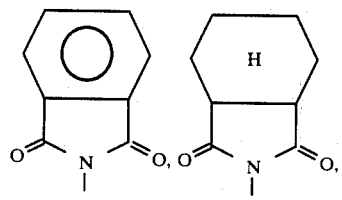

wherein n=1,2;
$R^3$ represents a $C_{1-18}$ alkyl group, when n=1, or a $C_{2-18}$ alkylene group, when n=2; and
$R^4$ represents H, or a $C_{1-20}$ alkyl group; and
(B) aliphatic or cycloaliphatic polyamines with more than two active hydrogen atoms bound to the nitrogen of the amino groups.

* * * * *